W. M. ROBERTS.
BAKING AND MOLDING DEVICE.
APPLICATION FILED AUG. 20, 1917.
1,294,536.
Patented Feb. 18, 1919.
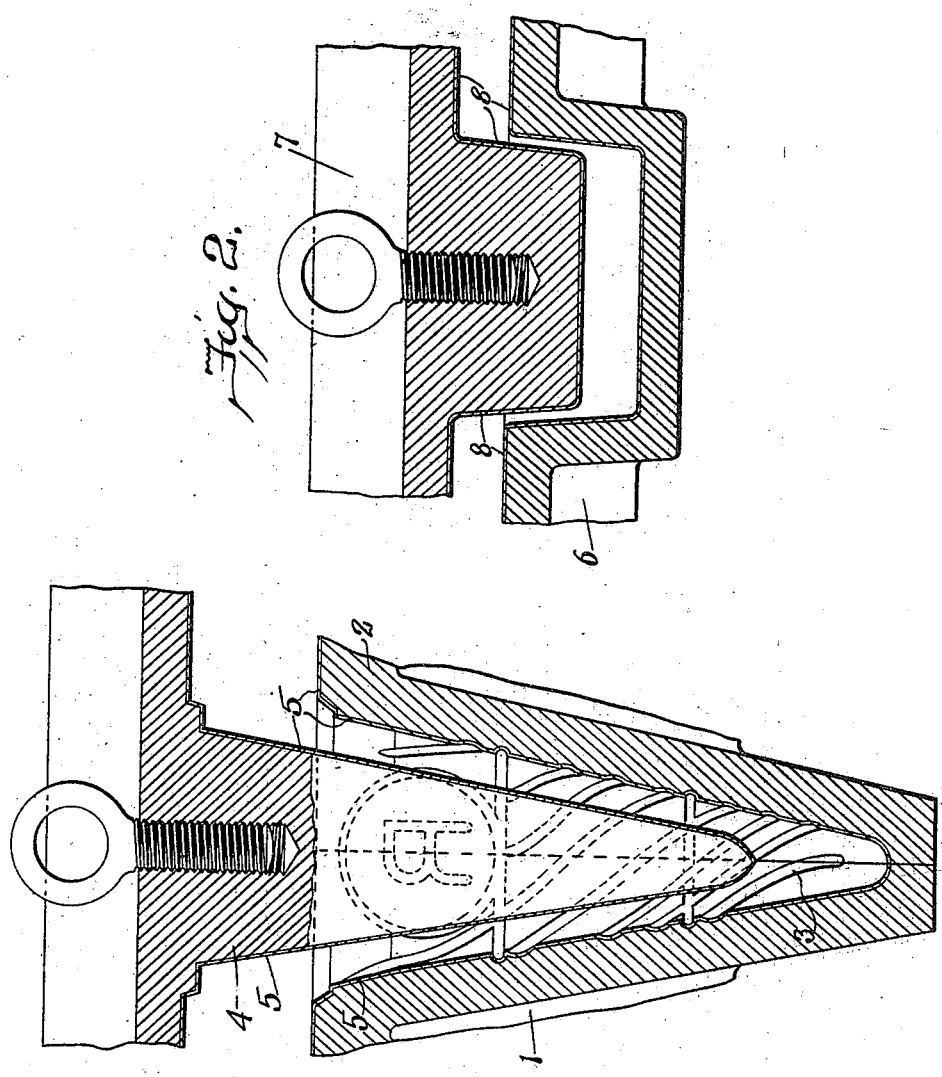
Inventor
Webster M. Roberts,
Toulmin & Toulmin,
Attorneys

UNITED STATES PATENT OFFICE.

WEBSTER M. ROBERTS, OF ST. JOSEPH, MISSOURI.

BAKING AND MOLDING DEVICE.

1,294,536.     Specification of Letters Patent.     Patented Feb. 18, 1919.

Application filed August 20, 1917. Serial No. 187,043.

*To all whom it may concern:*

Be it known that I, WEBSTER M. ROBERTS, a citizen of the United States, residing at St. Joseph, in the county of Buchanan and State of Missouri, have invented certain new and useful Improvements in Baking and Molding Devices, of which the following is a specification, reference being had therein to the accompanying drawing.

This invention relates to a molding device for producing improved pastry products, the use of the molding device including a novel process of manufacture.

The use of the invention produces an improved pastry article adapted to be filled with food or confections and having a hard impervious surface whereby cream or the like will not penetrate the article.

An object is to produce an improved molding device, whereby such articles may be molded and then baked, the improvement consisting mainly in the provision of a mold lined with nickel or nickel plated.

The use of such a mold results in a novel process of molding and baking pastry articles, the employment of a nickel lined or nickel plated mold, doing away with the necessity of using as much grease in the molds as was previously required.

Among the advantages to be derived from the use of such nickel lined or nickel plated molds in the baking of batter products, as above referred to, are that much less grease is necessary, an actual saving of some two gallons in a twenty-four hour run being accomplished, and the further great advantage that such a mold may be used on a new machine without having to go through a preliminary operation of greasing the molds until they become grease tempered. Also, in the use of such molds no cleaning of them is necessary as the pastry or batter products do not stick to the molds and this prevention of need for cleaning prevents delay in the operation of the molding devices and prevents the spoiling of such articles as formerly stuck to the mold and were therefore destroyed.

The result referred to is produced by the employment of nickel lined or nickel plated molds apparently for the reason that nickel is a very close grained metal and therefore it does not allow the grease to be absorbed in its surface as does cast iron. Also, the fact that the nickel is smooth and does not cause sticking of the batter articles provides a machine in which there is less strain on the parts due to the separation of the mold elements and it also provides a batter product having an impervious surface and a smooth polished exterior. The surface of the article is such that the material with which it is filled in practice, as ice cream for example, does not enter the surface of a baked article.

The drawings are to be understood as merely illustrative and as showing some of the uses to which a nickel lined or nickel plated mold may be put.

Figure 1 is a vertical section of a mold particularly adapted for baking the ordinary ice cream cones of commerce, the mold being shown as sectional and as provided with an inner member constituting a core;

Fig. 2 shows a mold adapted to form pastry shells, such as patties to contain vegetables or the like, this figure showing a mold having a single outer member and an interior core.

It will be understood that the types of molds shown are simply illustrative and that they would in practice be used in an organized machine of some type. For example, the mold of Fig. 1 may be employed in the machine of the patent to Roberts, No. 1,147,974, granted to the present applicant and Park D. Roberts on July 27th, 1915. However, the present invention may be employed in many other relations.

Referring to the drawings, Fig. 1 shows a mold having sectional outer members 1 and 2 which may be provided with corrugations 3. The core 4 is constructed to shape the batter and form a cone of the shape of the core. In use the two outer mold sections 1 and 2 are connected together and then the batter is poured in any desired way into the batter cup thus formed. Insertion of the core 3 into the mold sections 1 and 2 serves to force the batter up the inner edges of these sections and thus form the material into the desired cone shape. The entire mold is then carried or moved in any desired way into a heating oven or heating furnace and the batter then baked.

It will be noted that the mold sections 1 and 2 and the core 4 are each provided with nickel lined surfaces 5. These may be actual thin sheets of nickel or the nickel may be plated onto the material, such as cast iron, forming the mold sections and the core. In most cases the nickel would be applied by electro-plating until the desired thickness is attained.

In the form shown in Fig. 2 there is a single outer mold section 6 and a core 7, the two being shaped to coöperate in forming a baked batter product. Here also there is a sheet or plate of nickel 8 on the outer mold section 6 and on the core 7.

The operation of the device of Fig. 2 is substantially like that of Fig. 1 except as to the closing of the mold sections and need not be further described.

The applicant has found that the use of nickel lined molds and cores in such relations as are herein pointed out is of great advantage. When in ordinary household use a new griddle is to be employed it must be greased very thoroughly until the griddle becomes what is called "grease tempered" and an additional amount of grease continued to be used until that tempering effect is produced. The pores of the iron must absorb and retain enough grease so that the cakes do not stick before it becomes a satisfactory utensil. This situation is precisely what occurs in the baking of such batter products with ordinary cast iron molds. When a new machine is produced it is necessary to use grease very profusely for some time. The grease in practice is painted on with a brush and that operation continued until the machine turns out perfect cones or pastry shells. This may require several days and consume much valuable material without the production of commercially usable articles.

If the molds are nickel lined or nickel plated it is possible to start a new machine and within thirty to forty minutes be producing perfect cones or other articles. Thus, the delay in placing a new machine in operation is obviated, together with the very considerable loss of spoiled material in producing the grease tempering before referred to.

Also, in the continued use of such machines when cast iron molds are used the grease gradually works into the iron until it forms a coating. This becomes sticky and part of the cones adhere to the iron, causing much breakage of the product. It is then necessary to shut the machine down and give it a thorough cleaning, requiring several days' labor and considerable material. The highly burnished nickel lining being practically without pores keeps the grease from entering into the metal and thus does not require the periodical cleaning of the machine. Also, due to the surface not becoming sticky the cones continue to come out of the machine easily without causing the extra strain found in machines employing cast iron molds. In fact, the strain is so great in the case of cast iron molds it frequently causes breakage of the molds and this is entirely done away with by the employment of the nickel lining or nickel plating.

Also, in actual use the nickel plate permits the use of considerably less grease. It has been found by actual test that in an organized machine a saving of two gallons of the shortening oil used which provides the greasing effect was obtained in a twenty-four hour run of the machine.

Furthermore, the pastry articles, such as ice cream cones, produced from such nickel plated molds have a high polish and a hard impervious surface which does not take up the contained article, such as ice cream, readily. The articles also have a smooth polished exterior which produces a better appearance than similar articles formed with a cast iron mold and the articles produced by nickel plated molds are therefore more salable and a better commercial product.

It will be understood that in the drawings the nickel lining it shown with much exaggerated thickness for clearness. The nickel may be very thin, and if the nickel is plated on the mold electrically, its thickness may be only a few hundredths of an inch, or some such small amount.

A novel method of baking batter products is disclosed in this application but is not claimed herein.

Having thus fully described my invention, what I claim as new and desire to secure by Letters Patent, is:—

1. In a baking apparatus, a baking mold having an interior surface lined with nickel.

2. In a baking apparatus, a baking mold having an interior nickel plated surface.

3. In a baking apparatus, a baking mold having a corrugated interior surface lined with nickel.

4. In a baking apparatus, a baking mold having a corrugated interior nickel plated surface.

5. In a baking apparatus, a baking mold having a corrugated interior, and a core having a nickel plated interior, and constructed to shape batter in the cup.

6. In a baking apparatus, a baking mold, and a core having its exterior surface nickel plated and constructed to shape batter in the cup.

7. In a baking apparatus, the combination, with an outer mold member having a corrugated nickel plated interior, of an inner mold member having a nickel plated exterior and coöperating with said outer member to form a cupped batter product.

In testimony whereof I affix my signature.

WEBSTER M. ROBERTS.